United States Patent
Kaneda et al.

(10) Patent No.: US 8,210,127 B2
(45) Date of Patent: Jul. 3, 2012

(54) TWO-WAY DOOR PET RESTRICTION DEVICE

(75) Inventors: Daisuke Kaneda, Toyama (JP); Hidenori Okura, Toyama (JP)

(73) Assignee: Richell Corporation, Toyama (JP)

( * ) Notice: Subject to any disclaimer, the term of this patent is extended or adjusted under 35 U.S.C. 154(b) by 117 days.

(21) Appl. No.: 12/767,796

(22) Filed: Apr. 26, 2010

(65) Prior Publication Data

US 2010/0294206 A1 Nov. 25, 2010

(30) Foreign Application Priority Data

May 19, 2009 (JP) .................................. 2009-120994

(51) Int. Cl.
*A01K 1/02* (2006.01)
*A01K 31/06* (2006.01)
*A01K 31/10* (2006.01)

(52) U.S. Cl. ........................................ 119/481; 119/501

(58) Field of Classification Search .................. 119/459, 119/481, 494, 501, 524; 292/8, 10, 31, 42, 292/74, 120, 128, 101, 106, 107, 162, 170, 292/175, 145, 150, 277, 302, DIG. 30, DIG. 37, 292/DIG. 63

See application file for complete search history.

(56) References Cited

U.S. PATENT DOCUMENTS

| 3,556,058 A | * | 1/1971 | Smiler ........................... 119/474 |
| 4,570,574 A | * | 2/1986 | Burkholder .................... 119/481 |
| 5,016,926 A | * | 5/1991 | Sharp et al. ..................... 292/42 |
| 5,036,796 A | * | 8/1991 | deMuy et al. .................. 119/481 |

FOREIGN PATENT DOCUMENTS

| JP | 2002317579 A | * | 10/2002 |
| JP | 2007-151505 A | | 6/2007 |
| JP | 2008178299 A | * | 8/2008 |
| JP | 2008178366 A | * | 8/2008 |
| JP | 2010-268696 A | | 12/2010 |

OTHER PUBLICATIONS

Machine translation of JP 2008178299 to Miura, Takashi, published Aug. 7, 2008.*

* cited by examiner

*Primary Examiner* — Son T Nguyen
*Assistant Examiner* — Kathleen Iwasaki
(74) *Attorney, Agent, or Firm* — Conley Rose, P.C.

(57) ABSTRACT

In an embodiment of the disclosure, a pet restriction device is disclosed. The pet restriction device comprises an entry panel, at least one door located on the entry panel and comprising a door axis, and a locking device. The locking device comprises a handle, two bars, and two receivers. The handle is coupled to the door and located on the opposite side from the door axis. One end of each of the two bars is coupled to the handle. The two receivers are coupled to the entry panel, and each of the two receivers receives one of the two bars.

12 Claims, 8 Drawing Sheets

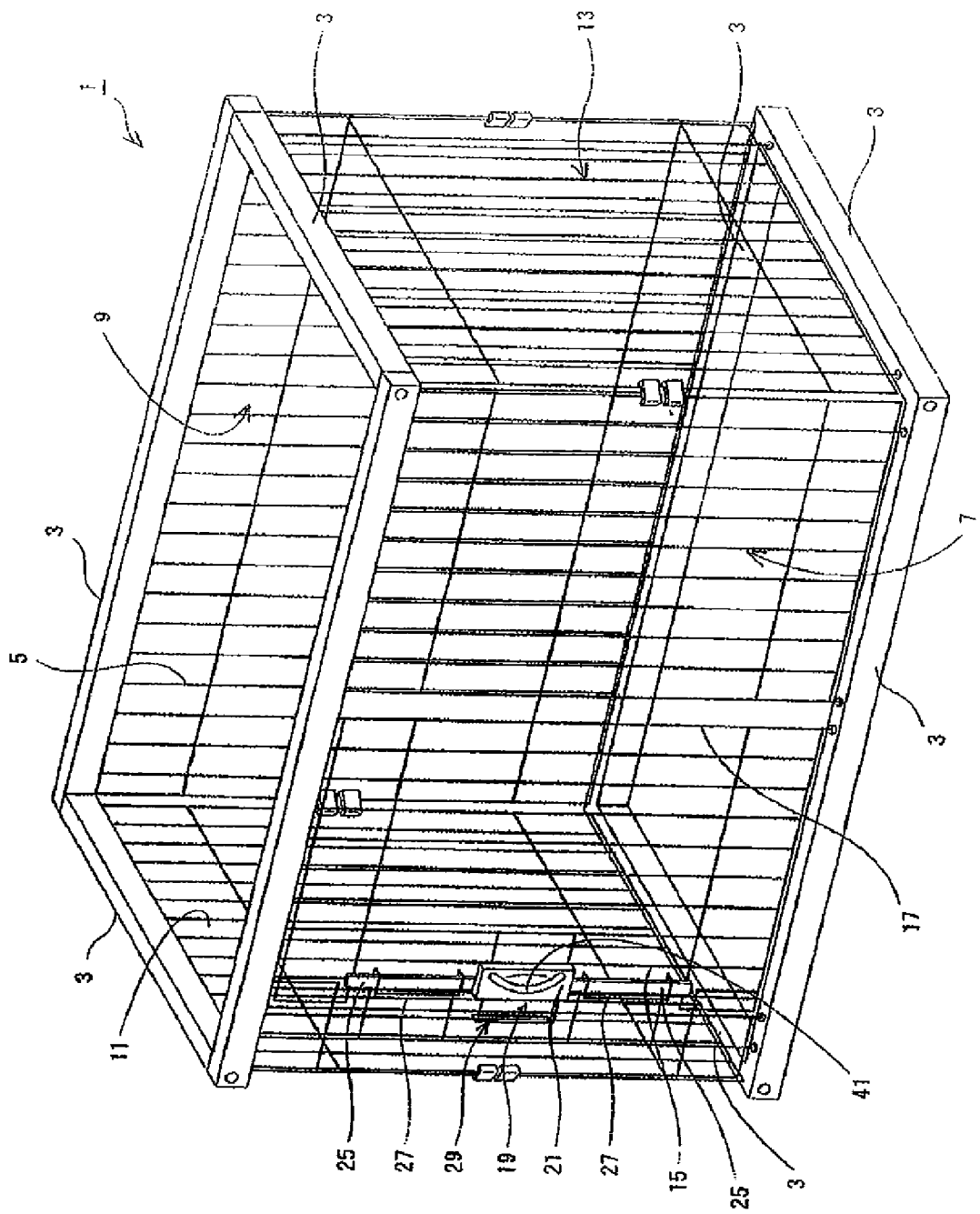

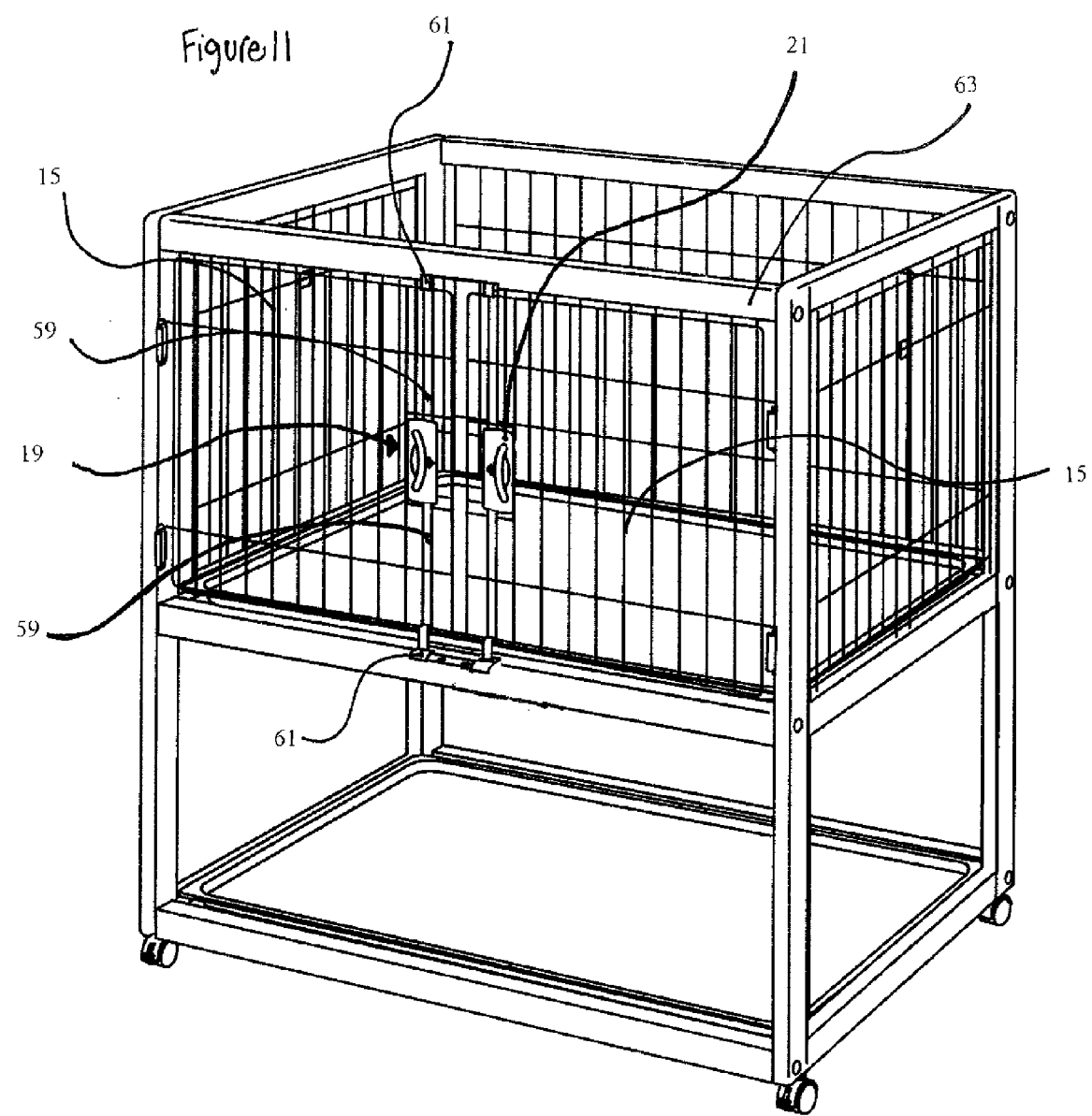

TWO-WAY DOOR PET RESTRICTION DEVICE

CROSS-REFERENCE TO RELATED APPLICATIONS

This application claims priority to Patent Application Serial No. 2009-120994, entitled "Two-Way Door Pet Pen with Floor Tray", filed with the Japan Patent Office on May 19, 2009, under the Paris Convention for the Protection of Industrial Property.

STATEMENT REGARDING FEDERALLY SPONSORED RESEARCH OR DEVELOPMENT

Not applicable.

REFERENCE TO A MICROFICHE APPENDIX

Not applicable.

FIELD OF THE DISCLOSURE

This disclosure relates to a pet restriction device for restricting the movement of a pet. More specifically, this disclosure relates to a locking device for a pet restriction device.

BACKGROUND OF THE DISCLOSURE

Sometimes owners of pets will use pet restriction devices, such as pet pens, to prevent their pets from having the run of the house. While pet pens are known, existing pet pens comprise locks that make it arduous for users to unlock and open the door of the pet pen. For example, locks on existing pet pens require the user to use multiple discontinuous motions in order to unlock and open the door of the pet pen. Further, existing pet pens use locks which can result in injury to a pet. For instance, a pet inside existing pet pens can press on the door causing the edge of the door to push away from the lock and pet pen. Such a behavior of a pet while inside the pet pen can create a gap between the door and the pet pen, thereby enabling the pet to become lodged in the gap and injure itself.

SUMMARY OF THE DISCLOSURE

In an embodiment of the disclosure, a pet restriction device is disclosed. The pet restriction device comprises an entry panel, at least one door located on the entry panel and comprising a door axis, and a locking device. The locking device comprises a handle, two bars, and two receivers. The handle is coupled to the door and located on the opposite side from the door axis. One end of each of the two bars is coupled to the handle. The two receivers are coupled to the entry panel, and each of the two receivers receives one of the two bars.

In another embodiment of the disclosure, a method for unlocking and opening a door located on an entry panel of a pet restriction device is disclosed. The method comprises applying a first force to a handle coupled to the door in a direction opposite the door axis and applying a second force to the handle in a direction about the door axis. Applying the first force and the second force consecutively creates a single fluid motion that unlocks and opens the door.

In yet another embodiment of the disclosure, a method for assembling a pet restriction device is disclosed. The method comprises placing an entry panel in a first position. When the entry panel is in the first position a door coupled to the entry panel opens in a first direction about a door axis. The method also comprises rotating the entry panel to a second position. When the entry panel is in the second position the door opens in a second direction about the door axis that is opposite the first direction. The door is unlocked and opened when the entry panel is in the first position and in the second position by applying a first force to a handle coupled to the door in a direction opposite the door axis and applying a second force to the handle in a direction about the door axis.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 1a is a perspective view of one embodiment of a two-way door pet restriction device with a door locking device.

FIG. 7 is a broken-out perspective view of one embodiment of a door locking device.

FIG. 11 is an alternate embodiment of a two-way door restriction device.

DETAILED DESCRIPTION OF THE PREFERRED EMBODIMENTS

Figure 1B:
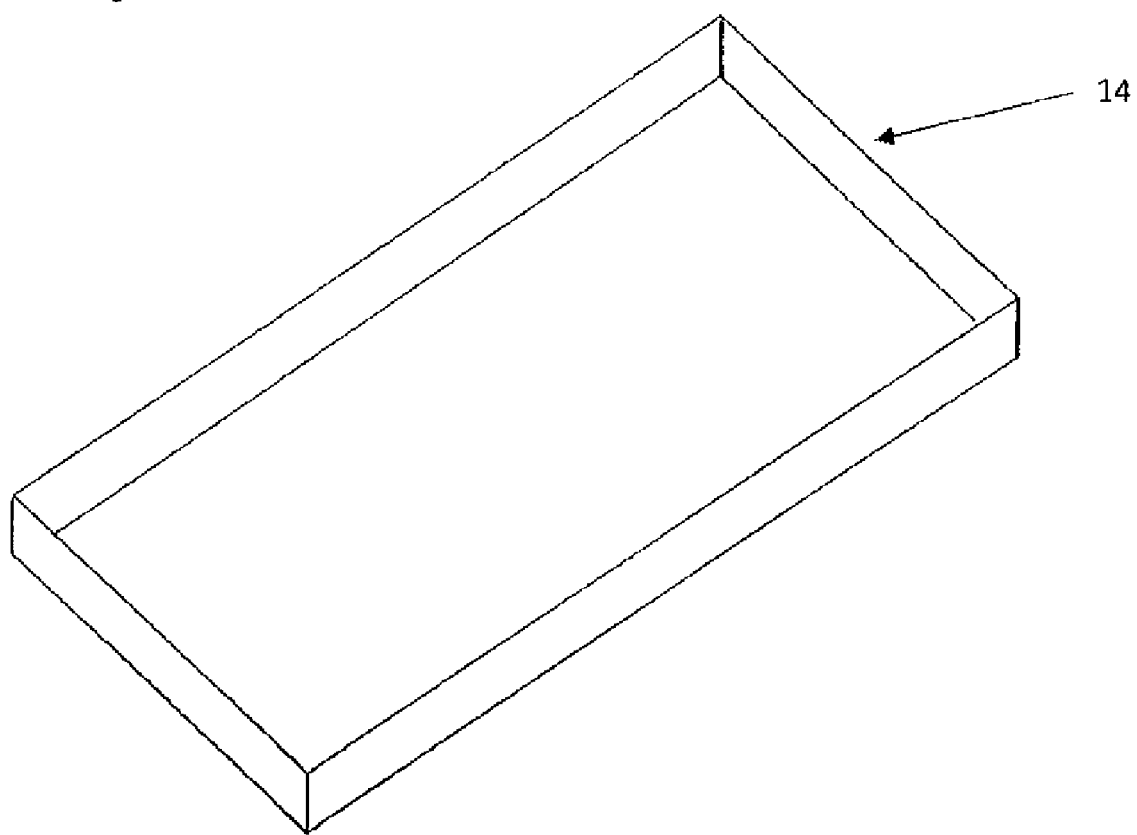
FIG. 1b is a perspective view of one embodiment of a floor tray.

The disclosure provides a two-way door pet restriction device that may be used to restrict the movement of pets. In one embodiment, the disclosure provides a door locking device for a two-way door pet pen. In an embodiment, the door locking device enables the door of the two-way door pet pen to be more easily unlocked and opened by a user. For example, the door of the two-way door pet pen is simultaneously unlocked and opened by applying a single fluid motion to the handle. The single fluid motion may be generated by applying a first force in a direction opposite the door axis and then applying a second force in a direction about the door axis. In another embodiment, the door locking device reduces the likelihood of injury to pets while the pets reside inside the pet pen. For example, when a pet pushes on the door, the door locking device prevents the pet from being able to push the edge of the door away from the door locking device and the two-way door pet pen. Thus, because the door locking device may prevent a pet from creating an opening while inside the two-way door pet pen, pets cannot become lodged in the opening and the likelihood of injury to pets is reduced.

In yet another embodiment, the two-way door pet restriction device can be assembled to have the door of the two-way door pet restriction device in one of two positions and open in one of two directions about the door axis. Enabling a user to have a choice as to the location of the door and the direction about the door axis which the door opens affords users greater flexibility. For example, users may assemble the two-way door pet restriction device based on where the particular user wants to place the two-way door pet restriction device. In another example, users may assemble the two-way door pet restriction device based on the user's dominant hand. No matter how the user assembles the two-way door restriction device, the locking device functions equally as well and the door is simultaneously unlocked and opened by applying a single fluid motion.

FIG. 1a illustrates an embodiment of the two-way door pet restriction device 1. The two-way door pet restriction device 1 may comprise an entry panel 7. In an embodiment, the entry panel 7 is self standing. In another embodiment, the entry panel 7 is capable of being coupled to a vertical plane such as a wall. Coupled as used herein means directly or indirectly coupled. In yet another embodiment, the entry panel 7 is coupled to one or more panels. For example, the entry panel 7 may be coupled to a first side panel 11, a second side panel 13, and/or a back panel 9. In an embodiment, each of the panels 7, 9, 11, and 13 comprises a plurality of vertical members 5. In one embodiment, the vertical members 5 are wires. In another embodiment, the vertical members 5 are wooden bars. In yet another embodiment, the vertical members 5 are plastic bars. In any embodiment, the vertical members 5 may be cylindrical or planar.

The two-way door pet restriction device 1, and specifically, the entry panel 7 coupled to one or more panels, may form any number of shapes. For example, the entry panel 7 and the one or more panels coupled to the entry panel 7 may be moved in such a way so as to form a straight line, a triangle, a square, a rectangle, a pentagon, a heptagon, a hexagon, an octagon, or any other shape. In an embodiment, the entry panel 7 and the one or more panels coupled to the entry panel 7 are open and are a non-self-enclosing set of line segments. Stated another way, the entry panel 7 and the one or more panels coupled to the entry panel 7 may be open where the end panels do not couple together. In another embodiment, the entry panel 7 and the one or more panels coupled to the entry panel 7 are self-enclosed, which means that the end panels couple together to form a closed loop. One example of the panels being coupled to one another to form a closed loop can be seen in FIG. 1a which illustrates the two-way door pet restriction device 1 as a rectangular pet pen.

In an embodiment, the entry panel 7 and the one or more panels coupled to the entry panel 7 are free standing. In another embodiment, the entry panel 7 and the one or more panels coupled to the entry panel may be coupled to a wall or a fixture to block a doorway, hallway, or stairway for example. One of ordinary skill in the art will appreciate that panels can be arranged in a wide variety of ways without departing from the scope of the disclosure.

In an embodiment, the two-way door pet restriction device 1 may comprise a frame. For example, the two-way door pet restriction device 1 may comprise a top and a bottom frame 3. The top and bottom frames 3 may be made out of wood, plastic, metal, or any combination thereof. Additionally, the top and bottom frames 3 may be rectangular, triangular, pentagonal, or another shape. In an embodiment, the shape of the top and bottom frames 3 is dependent upon the shape of the two-way door pet restriction device 1. For example, if the panels of the two-way door pet restriction device 1 are formed into a rectangular shape, the top and bottom frames 3 are rectangular. In another example, if the panels of the two-way door pet restriction device 1 are formed into a hexagonal shape, the top and bottom frames 3 could be hexagonal.

Referring again to FIG. 1a, an embodiment of the two-way door pet restriction device 1 is illustrated where the entry panel 7, back panel 9, first side panel 11, and second side panel 13 are coupled directly or indirectly to one another and to the top and bottom frames 3 to form a rectangular shape. However, as discussed above, the two-way door pet restriction device 1 may be formed into a number of different shapes dependent upon the desire of the user. In an embodiment, although not shown in FIG. 1a, the two-way door pet restriction device 1 comprises a top panel which sits on top of the front panel 7, back panel 9, first side panel 11, and second side panel 13 and closes off the two-way door pet restriction device 1. Such an embodiment prevents a pet from being able to exit through the top of the two-way door pet restriction device 1.

The two-way door pet restriction device 1 may also comprise a floor tray 14 as illustrated in FIG. 1b. In an embodiment, the floor tray 14 is made of plastic. The floor tray 14 may be of a size such that the two-way door pet restriction device 1 is contained within the floor tray 14. In another embodiment, the size of the floor tray 14 may be such that the two-way door pet restriction device 1 sits around the floor tray 14 and not on the floor tray 14 itself The shape of the floor tray 14 may follow the preferred shape of the two-way door pet restriction device 1. For example, if the panels of the two-way door pet restriction device 1 are formed into a rectangular shape, the floor tray 14 could be rectangular. In another example, if the panels of the two-way door pet restriction device 1 are formed into an octagonal shape, the floor tray 14 could be octagonal. The floor tray 14 could also be larger and differently shaped than the two-way door pet restriction device 1.

Figure 2:
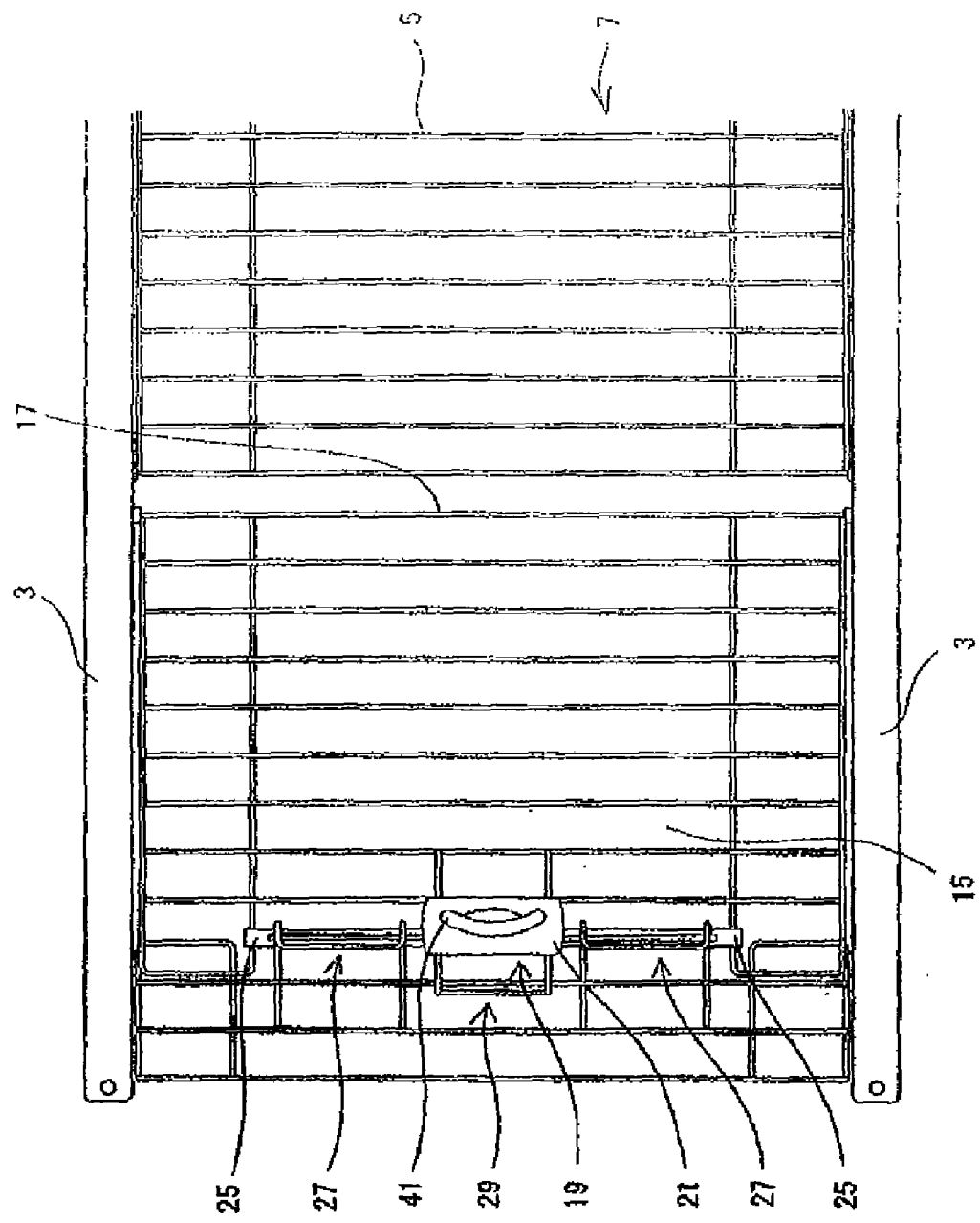
FIG. 2 is a front view of one embodiment of a two-way door pet restriction device with a door locking device.

Additionally, the two-way door pet restriction device 1 may comprise at least one door 15 located on the entry panel 7 which opens and closes by rotating around a door axis 17. In an embodiment, the two-way door pet restriction device 1 comprises a single door 15 as is illustrated in FIG. 2. The door 15 may be located substantially on one side of the entry panel 7. Also, the door 15 may be equal in size to substantially half of the entry panel 7. In an alternate embodiment, the door 15 is smaller than half of the entry panel 7. In yet another embodiment, the door 15 is larger than half of the entry panel 7.

In an alternate embodiment of the two-way door pet restriction device 1, the entry panel 7 comprises two doors 15 which each open and close by rotating around their own door axis 17. Such an alternate embodiment of the two-way door pet restriction device 1 is illustrated in FIG. 11. The size of each of the doors 15 may be substantially equal. In an embodiment, each door 15 is equal in size to substantially half of the entry panel 7.

The two-way door pet restriction device 1 may further comprise a door locking device 19. In an embodiment, the door locking device 19 is located on the opposite side of the door 15 from the door axis 17. For example, in FIGS. 1a and 2, the door locking device 19 is located on the left side of the door 15. In an embodiment, the door locking device 19 is substantially symmetrical about a horizontal axis. The horizontal axis about which the door locking device 19 is substantially symmetrical may be through the center of the door 15, the center of the entry panel 7, or the center of the door locking device 19. In an embodiment, the portions of the door locking device 19 on the door 15 and on the entry panel 7 are both symmetrical about the horizontal axis.

The door 15 may be located on the left side of the entry panel 7 as illustrated in FIG. 2 or on the right side of the entry panel 7. In either position, because the door locking device 19 is substantially symmetrical about a horizontal axis, the door locking device 19 functions equally as well. Also, in either position, the door 15 is opened and unlocked by applying forces in a single fluid motion away from the door axis 17 as will be discussed in greater detail below. In an embodiment, in order to change the side of the door 15 or the direction which the door 15 rotates in order to open, a user rotates the entry panel 7 about the center point of the entry panel 7. Rotating the entry panel 7 about the center point of the entry panel 7 may comprise rotating the entry panel 7 in a clockwise direction, a counter clockwise direction, or a combination of both a clockwise direction and a counter clockwise direction. Rotating the entry panel 7 in such a way enables the door 15 to be located on the opposite side of the entry panel 7 and to rotate about the door axis 17 in the opposite direction. In a preferred embodiment, the rotation of the entry panel 7 occurs within the same plane so that the front of the entry panel 7 remains facing the same environment. Front of the entry panel 7 as used herein means the side of the entry panel 7 to which the door 15 opens.

In another embodiment, in order to change the location of the door 15 or the direction which the door 15 rotates in order to open, a user rotates the entry panel 7 about a horizontal axis. Rotating the entry panel 7 about the horizontal axis may comprise rotating the entry panel 7 forward or backward so that the opposite side of the entry panel 7 faces the user. For example, if a user starts with the front of the entry panel 7 facing him or her, the user can change the location of the door 15 by rotating the entry panel 7 about the horizontal axis until the back of the entry panel 7 is facing the user. Rotating the entry panel 7 in such a way enables the door 15 to be located on the opposite side of the entry panel 7 and rotate about the door axis 17 in the opposite direction. Also, rotating the entry panel 7 in such a way enables the front of the entry panel 7 to face a different environment. If the user has remained stationary throughout the rotation, it may appear to the user that the door 15 is still located on the same side of the entry panel 7. However, if the user relocates after the rotation so that the user is facing the front of the entry panel 7 once again, it will become evident that the location of the door 15 has changed.

In some circumstances, a user may want the front of the entry panel 7 to face a different environment, but the location of the door 15 on the entry panel 7 and the direction which the door 15 rotates in order to open to remain the same. This may be accomplished by rotating the entry panel 7 about a vertical axis. Rotating the entry panel 7 about the vertical axis may comprise rotating the entry panel 7 to the left about the vertical axis, to the right about the vertical axis, or a combination thereof.

The user may assemble the two-way door pet restriction device 1 to have the door 15 on which ever side of the entry panel 7 they prefer. Also, the user may assemble the two-way door pet restriction device 1 to have the entry panel 7 and the door 15 face whatever environment they choose. In an embodiment, the user assembles the two-way door pet restriction device 1 to have the door 15 on a particular side of the entry panel 7 depending on where in the room the user is going to place the two-way door pet restriction device 1. In another embodiment, the user assembles the two-way door pet restriction device 1 to have the door 15 on a particular side of the entry panel 7 depending on the user's dominant hand.

FIGS. 1a and 2-7 illustrate an embodiment of the two-way door pet restriction device 1. Specifically, FIGS. 2-7 illustrate an embodiment of the door locking device 19 for the two-way door pet restriction device 1. The door locking device 19 for the two-way door pet restriction device 1 may comprise a handle 21, a spring 23, a pair of bars 25, and a pair of receivers 27. Each of these components is described in detail below.

The door locking device 19 may comprise a handle 21. The handle 21 may be located on the opposite side of the door 15 from the door axis 17. Also, the handle 21 may be located substantially in the center of door 15 or elsewhere along the door 15. In an embodiment, the handle 21 is attached to a door stop 29. The height of the handle 21 may be slightly larger than the height of the door stop 29. The door stop 29 may comprise two parallel horizontal members 31. In an embodiment, the parallel horizontal members 31 are wires. The horizontal members 31 may be attached to one or more vertical members 5 of the door 15. In an embodiment, the handle 21 slides laterally along the horizontal members 31. The door stop 29 may comprise an inward curved receiver 33 that faces inward toward the entry panel 7. For example, the horizontal members 31 may connect to one another to form the inward curved receiver 33. In an embodiment, the inward curved receiver 33 of the door stop 29 is a hook and the inward curved receiver 33 receives a vertical member 5 of the entry panel 7.

Figure 6:
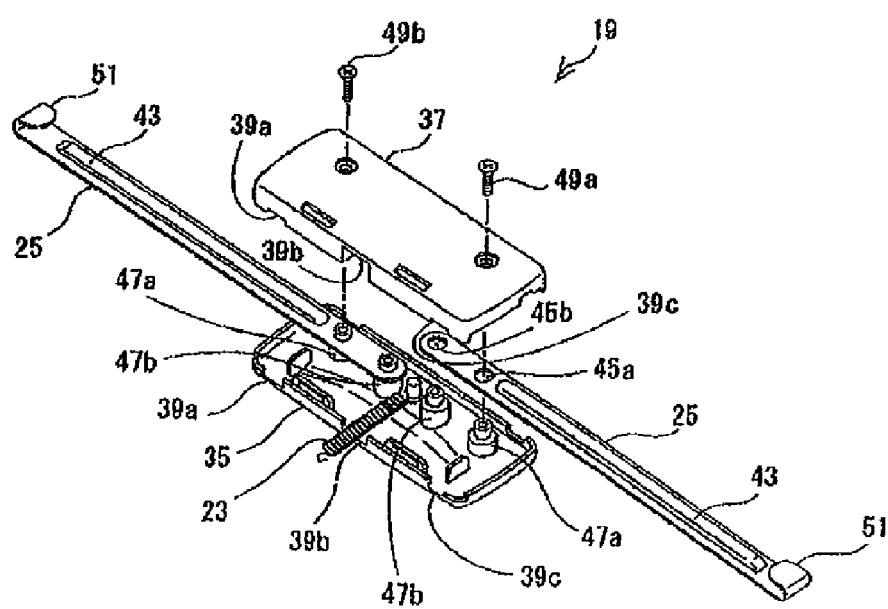
FIG. 6 is an exploded perspective view of one embodiment of a door locking device illustrating the individual parts of the door locking device.
Figure 17:
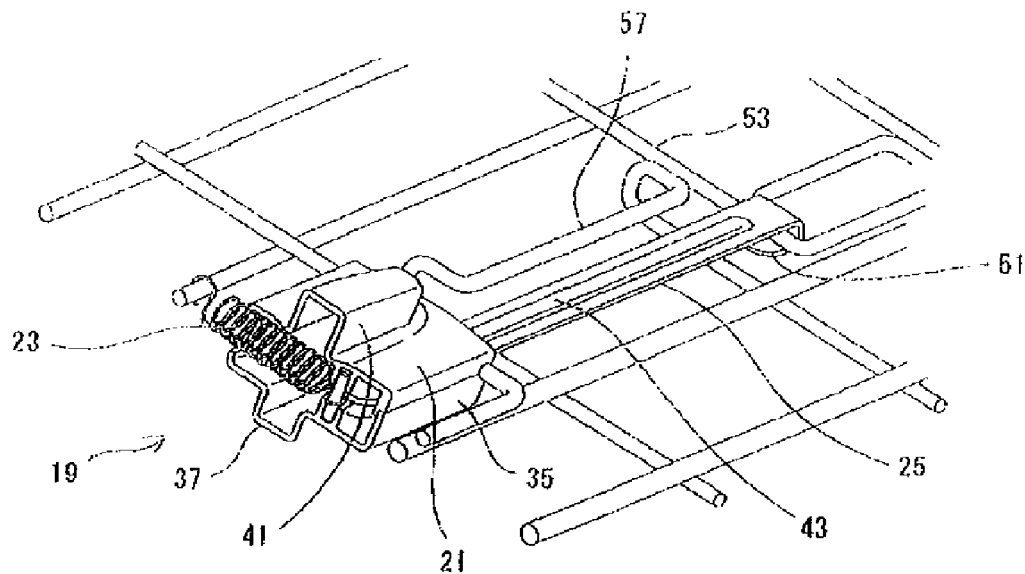

Referring to FIG. 6, the handle 21 may comprise a front cover 35 and a back cover 37. The front cover 35 and the back cover 37 may be any shape. In an embodiment, the front cover 35 and the back cover 37 are rectangular and the front cover 35 and the back cover 37 are coupled to one another to form a generally rectangular box. The long sides of the front cover 35 and the back cover 37 may comprise indentations 39a, 39b, and 39c. The indentations 39a and 39c may enable the horizontal members 31 to pass through the front cover 35 and the back cover 37. For example, the horizontal members 31 of the door stop 29 on the door 15 may pass through the top indentation 39a and the bottom indentation 39c thereby enabling the handle 21 to slide laterally along the horizontal members 31 of the door 15.

Figure 5:
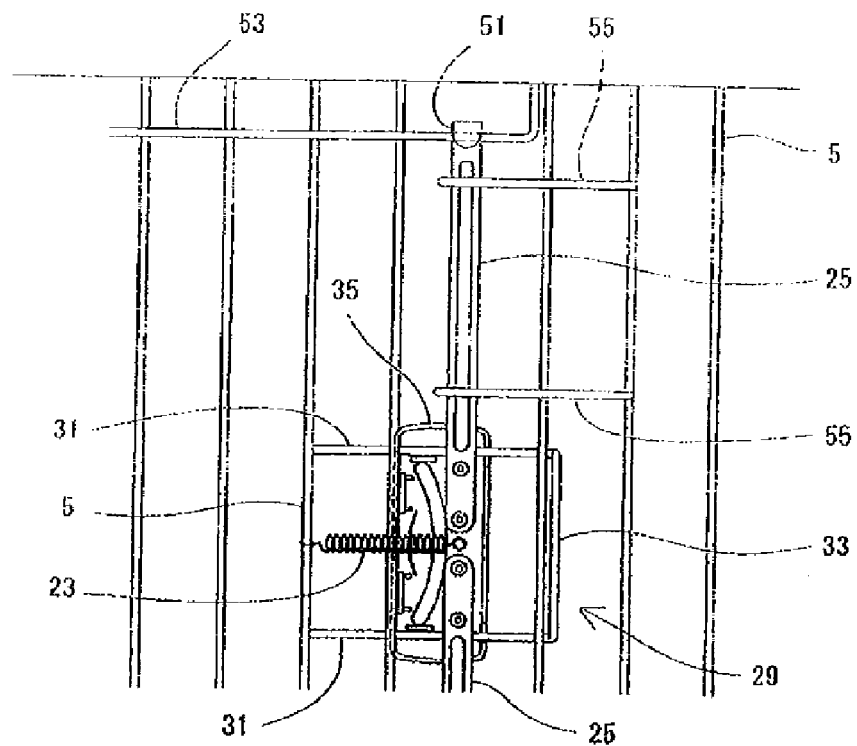
FIG. 5 is a back view of one embodiment of the front panel of a two-way door pet restriction device illustrating the back of a door locking device with the back cover of the door locking device removed.

Referring to FIGS. 5-7, the middle indentation 39b may enable one end of a spring 23 to stretch in and out from the handle 21. In an embodiment, the spring 23 is a coil spring. In an alternate embodiment, the spring 23 is some other member providing an elastic response as understood by those of ordinary skill in the art. One end of the spring 23 may be coupled to the front cover 35 of the handle 21 and the other end of the spring 23 may be coupled to a vertical member 5 of the door 15. In an embodiment, the spring 23 causes the handle 21 to be pulled in the direction of the door axis 17.

Referring again to FIGS. 2-7, the front cover 35 of handle 21 may comprise a grip 41. In an embodiment, the grip 41 is an arched grip that curves away from the door axis 17. The 41 grip may be made of plastic, rubber, or other material. In some embodiments, the material of the grip 41 or texture of the surface of the grip 41 enables a user to easily grasp the grip 41. The grip 41 may comprise a graduating thickness. For example, referring to FIG. 3, the center of the grip 41 may be thicker than ends of the grip 41. Additionally, the thickness of the grip 41 may taper off between the center of the grip 41 and the ends of the grip 41. In an embodiment, the center of the grip 41 may be substantially in the center of handle 21. Such an embodiment enables a user to unintentionally place his or her fingers in the middle of the handle 21 when opening and closing the door 15. Because the fingers are placed in the center of the handle 21, the force is applied to the center of the handle 21, which enables a balanced and smooth movement of the handle 21. In an embodiment, the curve of the handle 21 is designed such that a user may start sliding along the door 15 and smoothly transition the force to being around the door axis 17 without the need to substantially change hand position on the grip 41. For example, the curve of the handle 21 may comprise a lip forming a section of a three dimensional sphere or an oblate spherical shape. This smooth transition provides an experience of a single continuous motion for the user. Additionally, the lip of the handle 21 enables the smooth transition of the forces applied by the user by acting as an opposing force component about the door axis 17 as well as opposite the door axis 17.

The door locking device 19 may also comprise two bars 25. In an embodiment, the bars 25 are made of plastic. Alternatively, the bars 25 may be made of metal or another material. The bars 25 may be flat plates that comprise ribs 43. The ribs 43 may be in the center of the bars 25. In an embodiment, if a pet were to push on the door 15 while inside the two-way door pet restriction device 1, the ribs 43 help to prevent forward and backward movement of the door 15, thereby helping to reduce the likelihood of injury to pets.

Referring to FIGS. 5-6, one end of each of the bars 25 may comprise assembly holes 45a and 45b, which enable the bars 25 to be inserted into projections 47a and 47b of the front cover 35 of the handle 21. The bars 25 may be fixed into place by inserting screws 49a and 49b into holes through the back cover 37 of the handle 21 and assembly holes 45a into the projections 47a. In an embodiment, one of the bars 25 protrudes vertically from the top of the handle 21 and the other one of the bars 25 protrudes vertically from the bottom of the handle 21.

The other end of each of the bars 25 may comprise U-shaped receivers 51. In an embodiment, the U-shaped receivers 51 are U-shaped hooks. The U-shaped receivers 51 may be coupled to horizontal members 53. In an embodiment, the horizontal members 53 are wires. The U-shaped receivers 51 may be coupled to the horizontal members 53 such that when the bars 25 are moved, the bars 25 will not be uncoupled from the horizontal members 53. Stated another way, the U-shaped receivers 51 may be locked to the horizontal members 53. For example, one of the U-shaped receivers 51 of one of the bars 25 receives and locks to a top horizontal member 53 of the door 15 while the other one of the U-shaped receiver 51 of the other one of the bars 25 receives and locks to a bottom horizontal member 53 of the door 15. In an embodiment, the bars 25 slide smoothly along the door 15 accompanied by the handle 21 because the U-shaped receivers 51 of the bars 25 are guided by the horizontal members 53. Because the U-shaped receivers 51 of the bars 25 are locked to the top and bottom horizontal members 53 on the door 15, the upward and downward movements of the bars 25 may be restricted. The U-shaped receivers 51 of the bars 25 enable the bars 25 to move laterally along the horizontal members 53.

In an alternate embodiment, the U-shaped receivers 51 are Y-shaped. For example, the U-shaped receivers 51 may be Y-shaped hooks. In such an embodiment, the Y-shaped receivers wrap both sides of the horizontal members 53. While the Y-shaped receivers may help to control the lateral movement, the Y-shaped receivers do not necessarily prohibit the upward and downward movement of the bars 25. The Y-shaped receivers still enable the bars 25 to move laterally along the horizontal members 53.

In an embodiment, the length of each of the bars 25 is longer than half of the length of the vertical member 5 on the entry panel 7 of the door 15. In other words, the length of each of the bars 25 may be longer than half of the door 15 height. Setting the length of the bars 25 to such a length reduces the amount of clearance that can be created by a pet pushing on the door 15 while inside the two-way door pet restriction device 1, and thereby reduces the likelihood of injury to the pet.

Referring again to FIGS. 2-3, the door locking device 19 may also comprise pair of receivers 27. In an embodiment, when the door 15 is closed, one of the receivers 27 is located on the entry panel 7 above the handle 21 and the other one of the receivers 27 is located on the entry panel 7 below the handle 21. The two receivers 27 may be located substantially equidistant from the handle 21. The receivers 27 may be formed by attaching two equally spaced parallel horizontal members 55 to one or more vertical members 5 of the entry panel 7, and connecting the parallel horizontal members 55 together to form an outward curved U-shaped receiver 57 that turns outward away from the entry panel 7. The horizontal members 55 may be wires. In an embodiment, there are two sets of equally spaced parallel horizontal members 55 such that there are two outward curved U-shaped receivers 57. The outward curved U-shaped receivers 57 may be outward curved U-shaped hooks. When the door 15 is closed, the receivers 27, or more specifically the outward curved U-shaped receivers 57 of the receivers 27, may receive the bars 25. For example, each of the receivers 27 receives one of the bars 25.

In an embodiment, if a pet inside the two-way door pet restriction device 1 presses on the door 15, the door 15 is pushed outward and the bars 25 are pushed against the receivers 27. Thus, the bars 25 may not be able to go beyond the receivers 27 while a pet is locked inside the two-way door pet restriction device 1, which helps to avoid injuries to pets. For example, the receivers 27 help to prevent a pet on the inside of the two-way door pet restriction device 1 from pushing on the inside of the door 15 and creating a clearance between the door 15 and the entry panel 7 of the two-way door pet restriction device 1 such that the pet can become stuck in the clearance.

In an alternate embodiment of the two-way door pet restriction device 1, the door locking device 19 comprises a handle 21, a spring 23 (not shown), a pair of bars 59, and a pair of receivers 61. Such an alternate embodiment is illustrated in FIG. 11. In such an alternate embodiment, while the handle 21 and the spring 23 (not shown) may be substantially the same as described above, the pair of bars 59 and the pair of receivers 61 may be different than the pair of bars 25 and the pair of receivers 27. For example, as illustrated in FIG. 11, each receiver 61 is located on a frame 63 of the entry panel 7. One of the receivers 61 may be located on the top frame 63 of the entry panel 7, while the other of the receivers 61 is located on the bottom frame 63 of the entry panel 7. One end of each of the bars 59 may be coupled to the handle 21. The other end of each of the bars 59 may be of a shape such that it can be received by one of the receivers 61. This alternate embodiment provides greater locking strength at the corners of the doors, which makes it harder for the animal to push the corners of the door away from the two-way door pet restriction device 1 and thereby helps to reduce the likelihood of injury to the pet.

Figure 3:
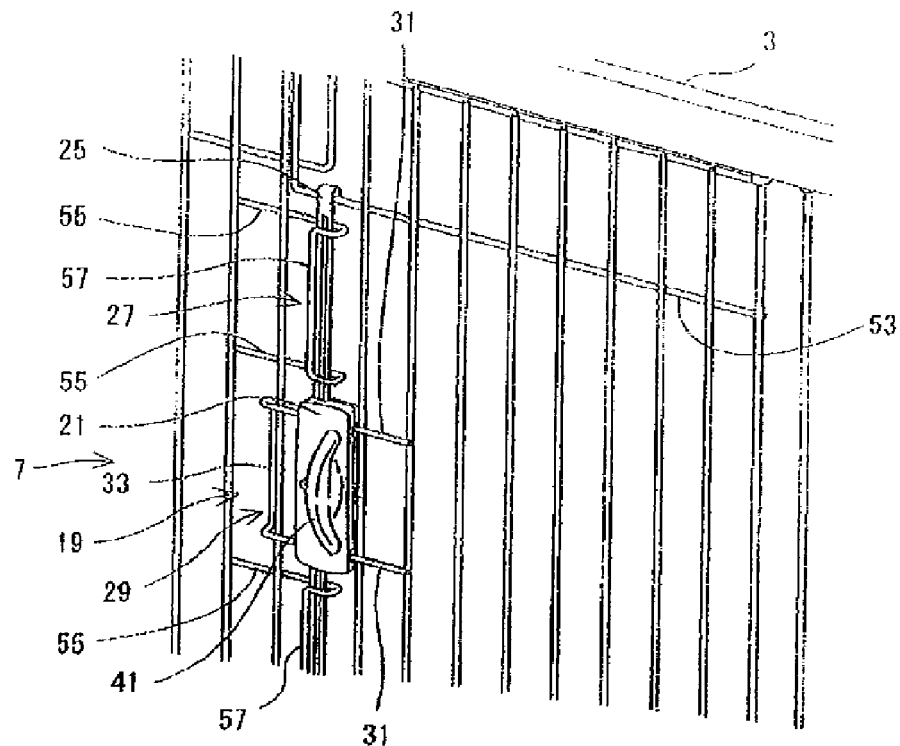
FIG. 3 is a front perspective view of one embodiment of the front panel of a two-way door pet restriction device illustrating the front of a door locking device.
Figure 4:
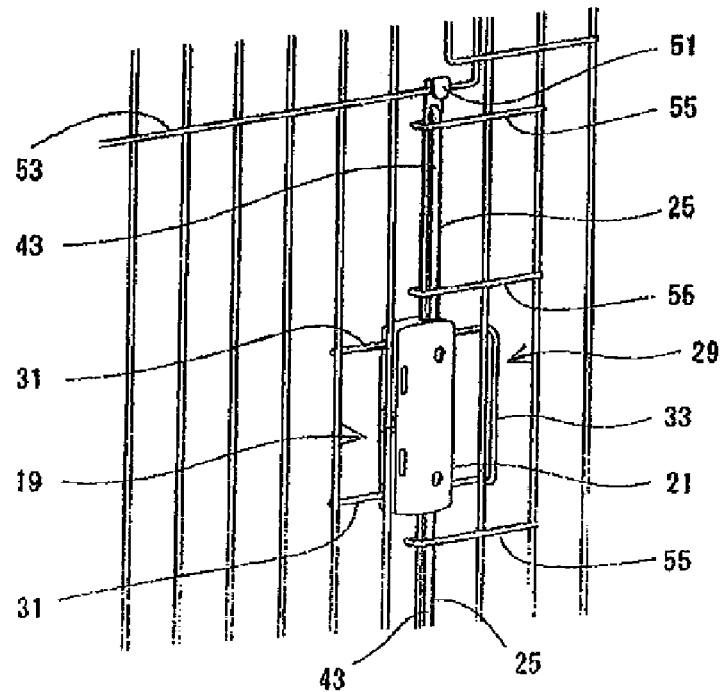
FIG. 4 is a back perspective view of one embodiment of the front panel of a two-way pet restriction device illustrating the back of a door locking device.

FIGS. 2-3 illustrate the door 15 in the closed position. When the door 15 is in the closed position, the handle 21 may be in a position closest to the door axis 17 because the spring 23 pulls the handle 21 in that direction. In an embodiment, the door 15 is locked in this position because the bars 25 are placed in the outward curved U-shaped receivers 57 of the receivers 27. In an alternate embodiment, such as illustrated in FIG. 11, the door 15 is locked in this position because the bars 59 are in the receivers 61.

Figure 8:
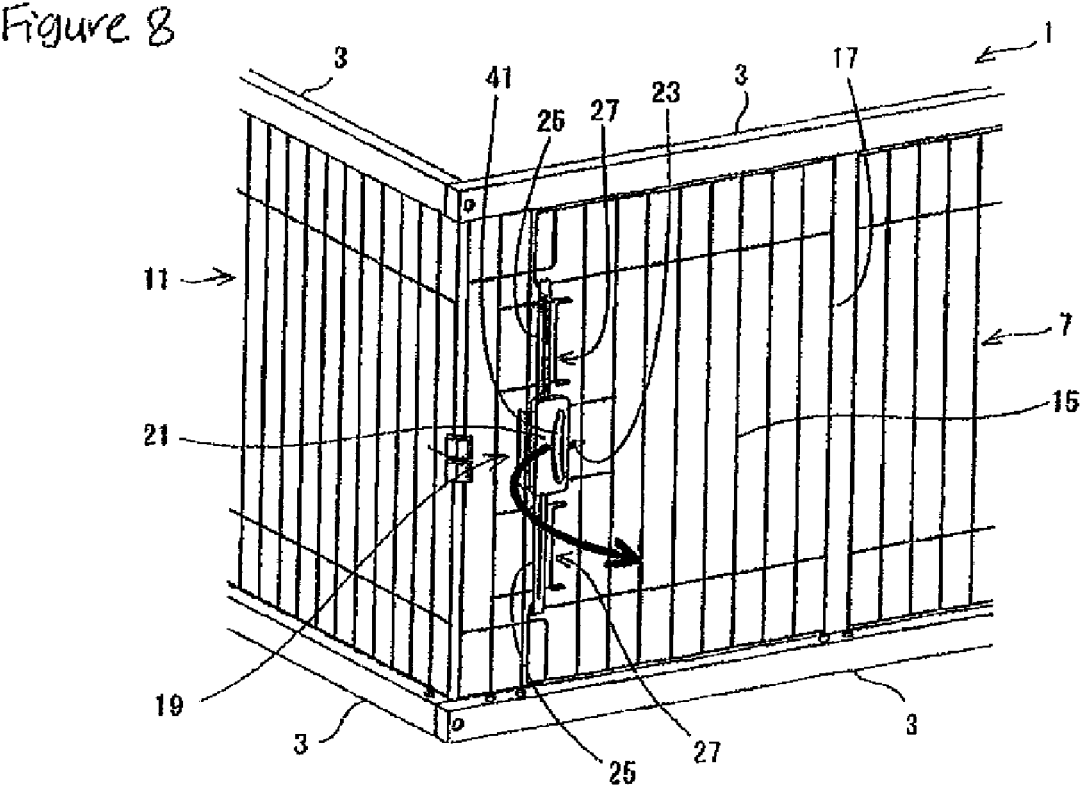
FIG. 8 is a perspective view of one embodiment of a two-way door pet restriction device with a door locking device illustrating the result of applying a first force to a handle of the door locking device.
Figure 9:
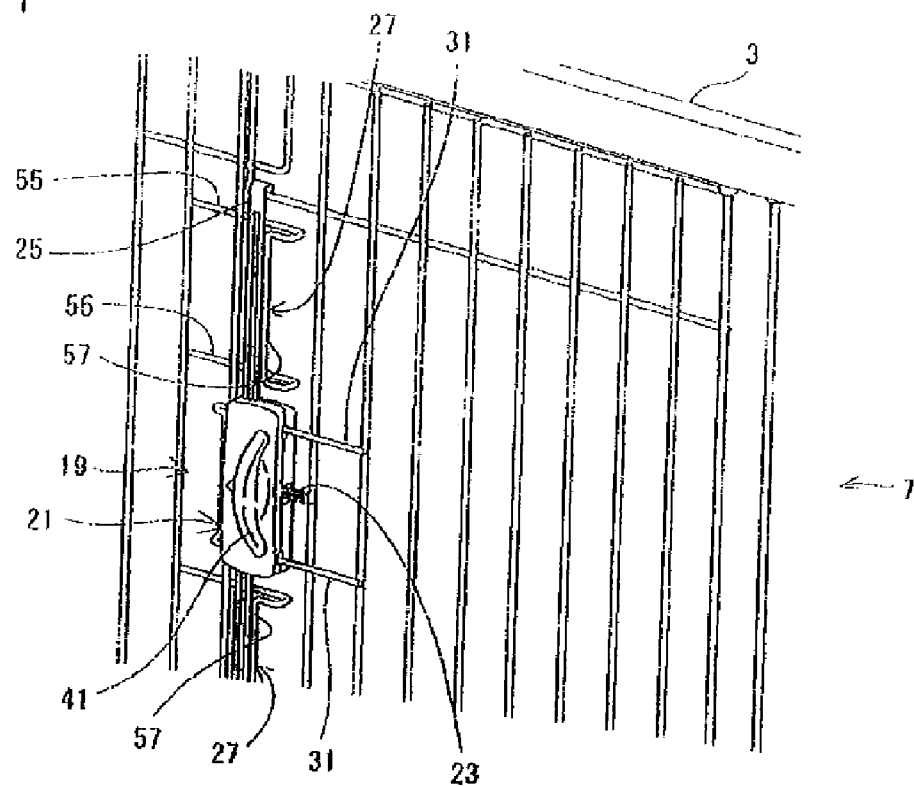
FIG. 9 is an enlarged view of FIG. 8.
Figure 10:
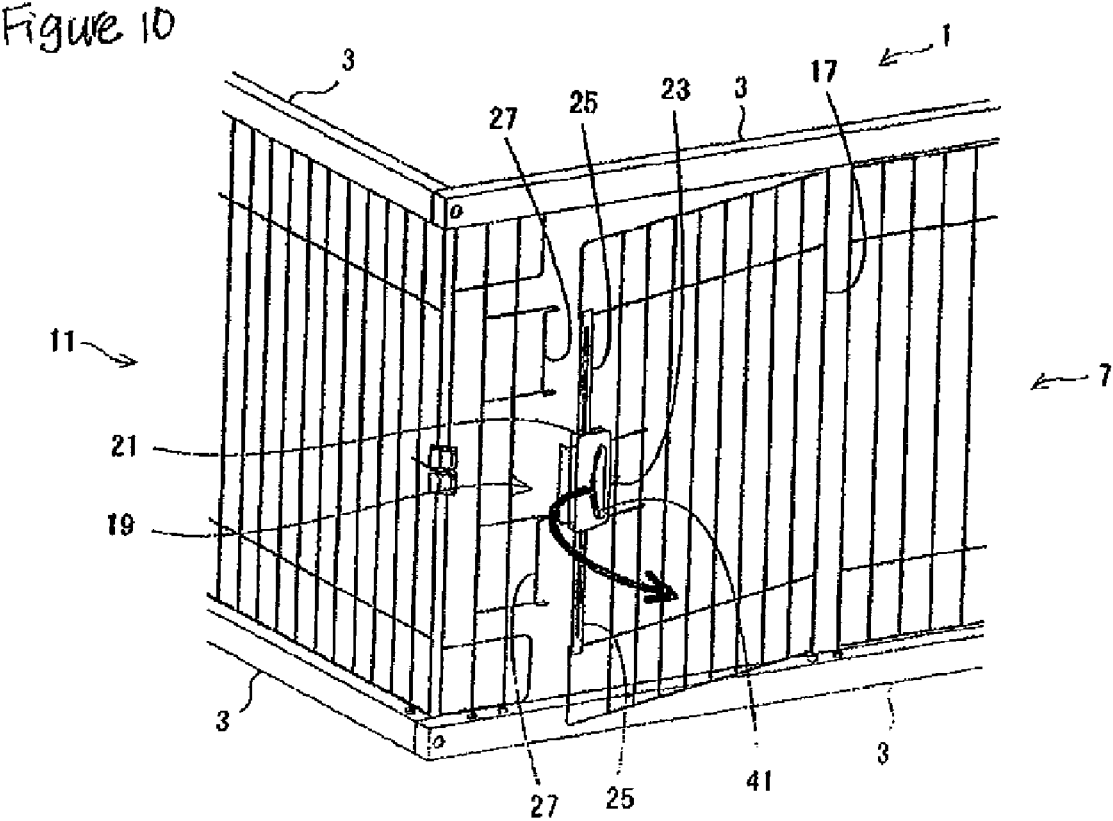
FIG. 10 is a perspective view of an embodiment of the two-way door pet restriction device with a door locking device illustrating the result of applying a second force to a handle of the door locking device.

FIGS. 8-10 illustrate how the door 15 of the two-way door pet restriction device 1 is opened and closed. The door 15 may be opened and closed by rotating the door 15 about the door axis 17. In an embodiment, to unlock and open the door 15, a user places his or her fingers along the grip 41 on the handle 21 and applies a single fluid motion to the handle 21. The arrows in FIGS. 8 and 10 illustrate this fluid motion. In an embodiment, the single fluid motion is generated by applying two forces to the handle 21 consecutively: (1) a first force in a direction opposite the door axis 17 and (2) a second force in a direction about the door axis 17. FIGS. 8-9 illustrate the result of applying the first force to the handle 21. In an embodiment, when the first force is applied to the handle 21 in a direction away from the door axis 17, the bars 25 are removed from the receivers 27 and the door 15 is unlocked. In an alternate embodiment, such as illustrated in FIG. 11, when the force is applied to the handle 21 in a direction away from the door axis 17, the bars 59 are removed from the receivers 61 and the door 15 is unlocked.

FIG. 10 illustrates the result of applying the second force to the handle 21 after the first force has been applied. In an embodiment, when the second force is applied to the handle 21 in a direction about the door axis 17 after the first force is applied, the door 15 is opened. Thus, in an embodiment, the door 15 of the two-way door pet restriction device 1 is simultaneously unlocked and opened by applying one smooth, continuous movement to the handle 21.

The door 15 of the two-way door pet pen may be closed and locked by pulling the handle 21 outward in a direction away from the door axis 17, pushing the door 15 to its closed position, and then releasing the handle 21. After the door 15 is in its closed position, the door 15 may automatically locked by releasing the handle 21 because the spring 23 pulls the handle 21 toward the door axis 17. When the spring 23 pulls the handle 21 toward the door axis 17, the bars 25 may be locked in the receivers 27. In an alternate embodiment, as illustrated in FIG. 11, when the spring 23 pulls the handle 21 toward the door axis 17, the bars 59 may be locked in the receivers 61.

While the above embodiments include a spring 23, in an alternate embodiment of the two-way door pet restriction device 1, the door locking device 19 does not use a spring 23. In such an alternate embodiment, in order to lock the door 15, after the door 15 is in its closed position, the user would have to manually move the handle 21 toward the door axis 17. Manually moving the handle 21 toward the door axis 17 will ensure that the bars 25 are secure in the receivers 27. In the alternate embodiment, as illustrated in FIG. 11, manually moving the handle 21 toward the door axis 17 ensures that the bars 59 are secure in the receivers 61.

Accordingly, in the embodiments of the two-way door pet restriction device 1, a user may unlock and open the door 15 without a conscious deliberation of the motion to be applied to the handle 21. For example, a user merely needs to apply a single fluid motion to the handle 21 in order to open and unlock the door 15 of the two-way door pet restriction device 1.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A pet restriction device, comprising:
   an entry panel;
   at least one door located on the entry panel and comprising a door axis; and
   a locking device, comprising:
      a handle coupled to the at least one door and located on the opposite side from the door axis;
      two bars, wherein one end of each of the two bars is coupled to the handle, wherein the other end of each of the two bars comprises a hook and is coupled to a different horizontal member of the at least one door, and wherein the other end of each of the two bars is coupled to the corresponding different horizontal member of the at least one door via the hook which enables each of the two bars to slide laterally along the corresponding different horizontal member of the at least one door;
      two receivers coupled to the entry panel, wherein each of the two receivers receives one of the two bars; and
      a spring coupled to the handle and a member of the at least one door, wherein the spring causes the handle to be constantly pulled toward the door axis.

2. The pet restriction device according to claim 1 further comprises one or more additional panels, wherein the one or more additional panels are coupled to the entry panel.

3. The pet restriction device according to claim 2, wherein the one or more additional panels comprises a first side panel, a second side panel, and a back panel, and wherein the first side panel and the second side panel are coupled to the entry panel and the back panel to form a rectangle.

4. The pet restriction device according to claim 1, wherein one of the two bars protrudes vertically from the top of the handle and the other one of the two bars protrudes vertically from the bottom of the handle.

5. The pet restriction device according to claim 1, wherein one of the two receivers is located at a distance above the handle and the other of the two receivers is located at substantially the same distance below the handle.

6. The pet restriction device according to claim 1, wherein the two receivers are hooks that face away from the entry panel.

7. The pet restriction device according to claim 1, wherein the at least one door is configured to be unlocked and opened with a single fluid motion by consecutively applying a first force to the handle in a direction away from the door axis and a second force to the handle in a direction about the door axis.

8. The pet restriction device according to claim 7, wherein when the first force is applied to the handle each of the two bars is released from one of the two receivers.

9. The pet restriction device according to claim 1, wherein the handle comprises an arched grip that curves away from the door axis, and wherein the center of the arched grip is substantially in the center of the handle.

10. The pet restriction device according to claim 9, wherein the arched grip comprises a graduating thickness, and wherein the graduating thickness is thickest at the center of the arched grip and tapers off towards each end of the arched grip.

11. The pet restriction device according to claim 1, wherein the handle is located substantially in the center of the at least one door.

12. The pet restriction device according to claim 1, wherein each of the two bars comprises a rib to reduce forward and backward movement of the at least one door.

* * * * *